July 25, 1967 W. KASSALIK 3,332,366
DEVICE FOR PRODUCTION OF CHOCOLATE OR OTHER SIMILARLY
COVERED NUTS OR ALMOND PARTICLES
Filed Oct. 12, 1964 2 Sheets-Sheet 2
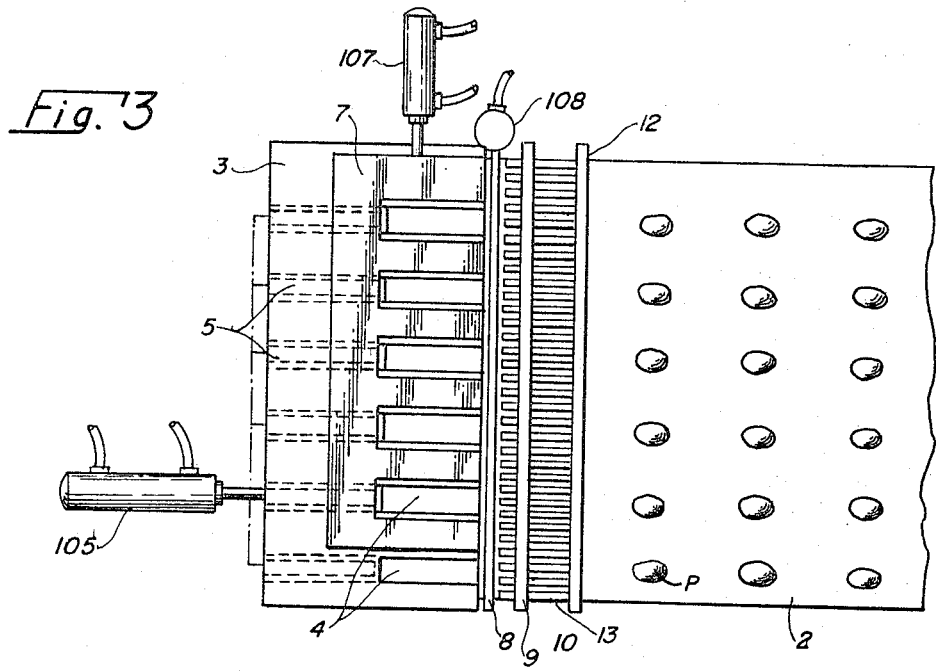
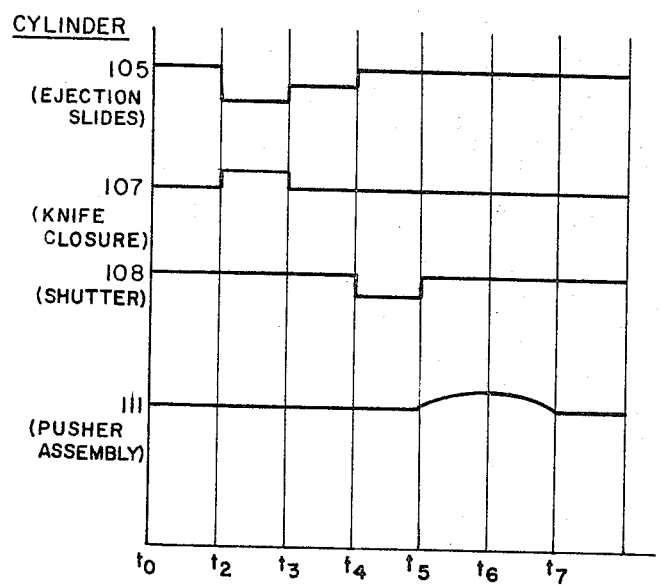
TIMING DIAGRAM
(HYDRAULIC CYLINDER ACTIVATION)
INVENTOR.
WALTER KASSALIK
BY
Karl F. Ross
AGENT United States Patent Office 3,332,366
Patented July 25, 1967

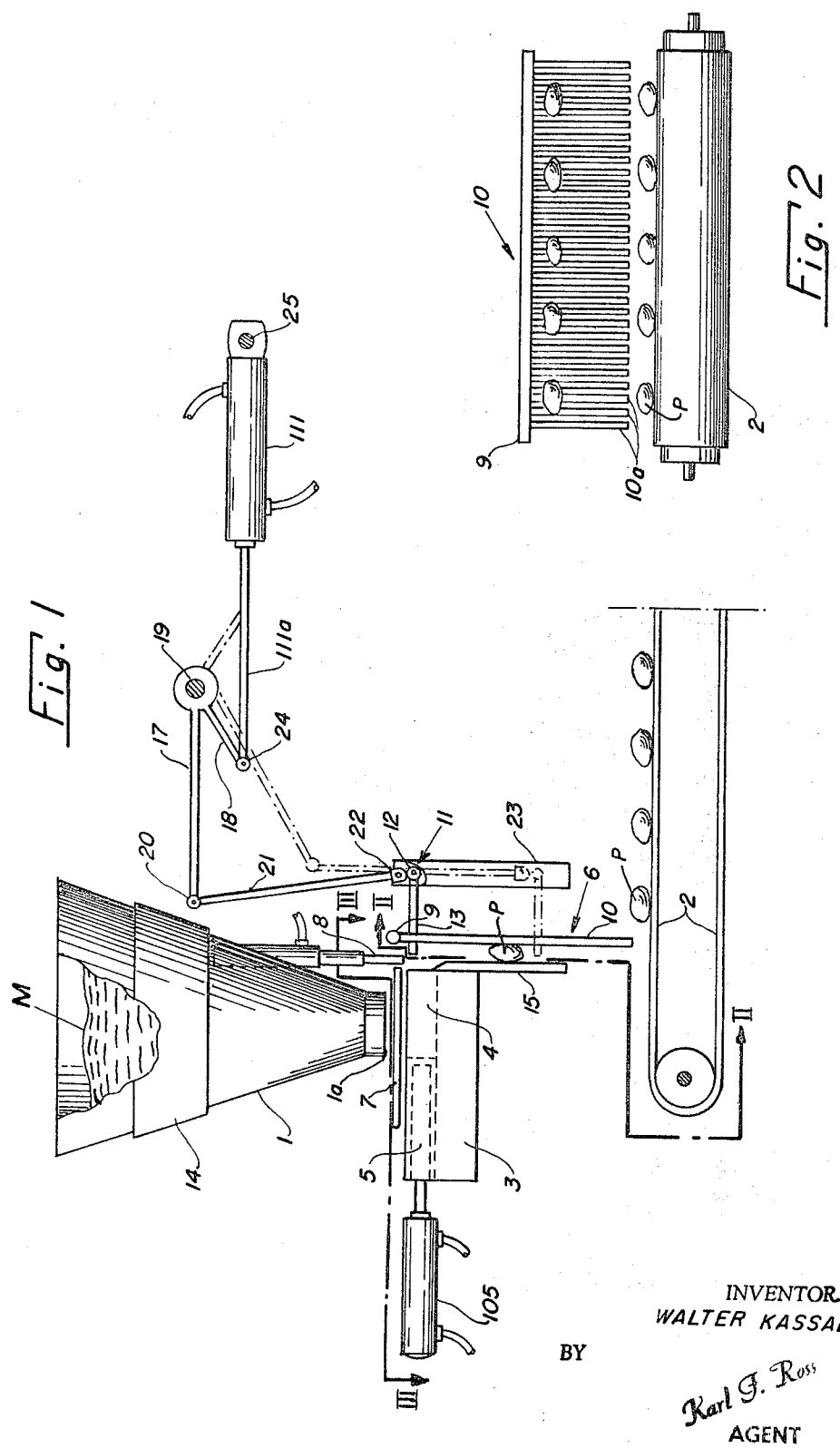

3,332,366
DEVICE FOR PRODUCTION OF CHOCOLATE OR OTHER SIMILARLY COVERED NUTS OR ALMOND PARTICLES
Walter Kassalik, Birkenstrasse 19, Bottrop, Germany
Filed Oct. 12, 1964, Ser. No. 403,309
Claims priority, application Germany, Oct. 14, 1963, K 51,078
11 Claims. (Cl. 107—15)

My present invention relates to a device for producing chocolate or other similarly covered nuts or almond particles in the confectionery industry.

Chocolate-coated nuts and almond particles have been generally produced heretofore with conventional equipment which consists basically of a storage bin or hopper to contain the chocolate-and-nuts mixture, a delivery chute with appropriate molds or channels for receiving the mixture, and a conveyor belt for transporting the finished confectionery. Such well-known devices do not function automatically. They usually consist of a dispenser and associated delivery mechanism located on a mold plate with a multiplicity of mold forms. These mold forms are filled with the confectionery mixture and the finished product is subsequently expelled by means of plungers or fingers mounted on the mold plate. The ejection occurs in a vertical plane and the ejected product falls upon a conveyor belt. This method, however, is detrimental since the vertical fall of the product introduces considerable flattening and deformation of the confectionery. Therefore, the production of this particular confectionery is accomplished primarily by hand. This procedure is necessarily time-consuming and costly, and results in low output. Additionally, variations are introduced owing to the human factor involved in production.

It is the object of the present invention to provide a device for producing confectionery of the type described at a high production rate resulting in a uniform product, without the flattening and deformities inherent in conventional manufacturing procedures.

The device according to my invention comprises a storage bin or hopper which contains the mixture of chocolate and nut or almond particles, or such other mixture as may be desired to be utilized for the confectionery. Below the discharge outlet of the bin or hopper, I provide one or more molds or channels into which the mixture is dispensed. Ejection sliders or pistons subsequently eject the confectionery from the mold channels onto a substantially vertical wall of a chute which is located at the ejection port of the mold channels. The confectionery adheres to the chute wall and slowly slides down to a conveyor belt on which it alights after a short drop so as to avoid deformation.

A more specific feature of my invention resides in the addition to the chute of a pusher assembly which assists the force of gravity in stripping the confectionery from the chute wall and overcoming the effect of viscosity of the chocolate or other coating mass in advancing the confectionery onto the conveyor belt. In this case the chute wall opposite the feed channels is advantageously slotted vertically, as by being composed of straight metal or plastic rods, strips, or other preferably resilient elements spaced at regular intervals in a comb-like array. The pusher assembly may then comprise similar transverse rods or bars interposed between the elements of the chute wall. Following ejection of the confectionery onto the chute wall, a subsequent vertical reciprocatory movement of the pusher assembly advances the confectionery onto the conveyor belt.

The conveyor belt may be controlled by any appropriate electro-mechanical system to effect a momentary pause in its transport during the period when the confectionery drops from the chute onto the belt. This precludes the possible introduction of minor variations in physical conformation of the confectionery due to belt movement at the instant of confectionery contact with the belt.

The above and other objects, features and advantages of the present invention will become more readily apparent from the following detailed description, reference being made to the accompanying drawing in which:

FIG. 1 is an elevational view of a device for producing confectionery in accordance with my invention;

FIG. 2 is a detail view taken on the line II—II of FIG. 1;

FIG. 3 is a plan view taken on the line III—III of FIG. 1; and

FIG. 4 is a timing diagram which illustrates graphically the sequence of operating steps of the device shown in FIGS. 1-3.

As shown in FIG. 1, a storage bin or hopper 1 contains a mixture M of chocolate and nuts or almond particles maintained at an optimum discharge temperature by a heating jacket 14. The discharge outlet of hopper 1 is normally closed by a blade slide 7 which is actuated by the piston of a hydraulic cylinder 107 (see FIG. 3). Blade slide 7 serves the dual function of sealing the discharge outlet 1a of hopper 1 until discharge commences, and of cutting through the dispensed confectionery after discharge terminates. A multiplicity of horizontal mold channels 4, milled in a base plate 3, receive the dispensed confectionery and determine its configuration. Ejection plungers 5, actuated by the piston of a hydraulic or pneumatic cylinder 105, eject the confectionery from mold channels 4 onto a vertical wall 10 which defines a chute 6 with another wall 15 parallel thereto. The tacky confectionery slides down the chute and drops onto a conveyor belt 2 for subsequent processing and packing.

The configuration of wall 10 is best illustrated in FIG. 2. This wall comprises basically a horizontal bar 9 which supports a plurality of spacedly juxtaposed vertical rods 10a suspended from bar 9 so as to terminate at a level just above conveyor belt 2.

The opposite chute wall 15 consists of a similar comb-like array suspended from base plate 3. Chute wall 15 also serves to guide discharged confectionery particles and scraps away from the ejection port of mold channels 4, thereby preventing adherence of the particles to base plate 3.

Slide 7, actuated by the piston of a cylinder 107 (see FIG. 3), consists of a blade with a plurality of cutouts which are substantially coextensive with mold channels 4 when slide 7 is placed in a retracted position for the discharge of confectionery mixture from hopper 1. It will be seen that this closure member 7 seals the discharge outlet 1a of hopper 1 until this withdrawal; thus upon its next forward stroke, it cuts through the confectionery entering the channels 4 after the desired quantity thereof has been dispensed.

A slidable shutter 8 (FIGS. 1 and 3) is vertically displaceable by the piston of a hydraulic cylinder 108. Shutter 8 serves to seal the ejection ports of mold channels 4 during discharge of confectionery mixture from hopper 1. When the confectionery has been metered into mold channels 4 and member 7 closes the outlet 1a, movable shutter 8 rises to allow the extrusion of confectionery into chute 6.

The ejection plungers 5, actuated by the piston of hydraulic cylinder 105, perform the triple function of creating a partial vacuum within mold channels 4 during their rearward strokes (to the left in FIG. 1), thereby aiding the discharge of confectionery mixture from hopper 1; compressing the confectionery within the mold channels after discharge from hopper 1 during the forward stroke; and ejecting the confectionery from these channels into chute 6 for ultimate delivery to conveyor belt 2.

A pusher assembly 11 (shown in FIGS. 1 and 3) comprises basically a bar 12 rigid with a plurality of closely spaced stripping rods 13 which extend distally in a horizontal plane through the interstices formed by the depending elements 10a of chute wall 10. Pusher assembly 11 is actuated by the piston of a hydraulic cylinder 111 which moves bar 12 and rods 13, through a mechanical linkage, in a vertical reciprocatory path to push the confectionery down the chute 6 onto conveyor belt 2. Pusher assembly 11 then returns to its original position until the next cycle occurs with consequent ejection of pieces of confectionery P from the ejection ports of mold channels 4.

To avoid deformation of the product P, the speed of the stripper elements 13 is reduced progressively as the pusher 11 approaches the end of array 10a of chute wall 10. Thus the confectionery is not pushed onto belt 2 at an excessive rate of movement. Conversely, the return speed of pusher 11 increases progressively to prevent the strippers 13 from departing too rapidly from the tacky surface of the pieces P deposited upon belt 2. This initially slow return stroke obviates the possibility that pieces P would adhere to the rods 13 and be entrained thereby. The variable speed of pusher 11 is imparted to it by a mechanical and hydraulic linkage comprising the piston rod 111a of hydraulic cylinder 111 which is pivoted to its mounting (not shown) at 25, a crank 17, and a connecting rod 21. The rod 21 is interposed between and articulated to crank 17 and pusher bar 12 by hinges 20 and 22, respectively. Crank 17 is journaled on shaft 19 and has, as an integral portion, an arm 18 articulated at 24 with the piston rod 111a. Pusher 11 is guided within a sleeve 23 in its descent and ascent.

At the start of a cycle, piston rod 111a is fully extended as illustrated by solid lines in FIG. 1. Crank 17 is now substantially perpendicular to the vertical path of pusher 11 which is fully elevated within sleeve 23. As piston rod 111a retreats, pusher 11 descends to the lower limit of its excursion as shown by dot-dash lines in FIG. 1. Crank 17 is at an oblique angle with pitman 21 at the termination of the descending stroke; consequently, the rate of movement of pusher 11 decreases as it approaches the lowest point in its downward travel. Subsequent ascent of pusher 11 to its position of maximum elevation occurs when piston rod 111a is again extended.

Belt 2 is a conventional mechanical conveyor which carries the finished confectionery pieces P to subsequent processing and packing stations.

The operation of the device according to my invention is substantially as follows:

Prior to the commencement of the discharge cycle from hopper 1 into mold channels 4, cutter 7 is advanced by the piston of hydraulic cylinder 107 to seal the discharge outlet 1a. Also, shutter 8 is lowered by the piston of hydraulic cylinder 108 to seal the ejection ports of mold channels 4. Additionally, plungers 5 are extended by the piston of hydraulic cylinder 105 into their forward position in which their faces are immediately adjacent the slide 8. Pusher 11 is lifted by the piston of hydraulic cylinder 111 to its highest level and the elements 13 thereof are consequently positioned above the ejection ports of mold channels 4. This is the condition illustrated at interval $t_0$ in FIG. 4.

When the discharge cycle commences, ejection plungers 5 are retracted by the piston of cylinder 105 to their rearward position (time $t_1$ in FIG. 4). This stroke is effected rapidly and thereby induces a partial vacuum within the mold channels 4 bounded by plungers 5, cutter 7, movable shutter 8 and base plate 3. When the plungers 5 are fully withdrawn, cutter 7 is withdrawn by the piston of hydraulic cylinder 107, thereby unblocking the discharge outlet 1a and allowing the warm, fluid confectionery mixture to flow from hopper 1 into mold channels 4. After a predetermined period ($t_2$ in FIG. 4) during which time the confectionery mixture has been pouring into channels 4, ejection plungers 5 are moved forward by the piston of cylinder 105 to a partially extended position selected in conformity with the desired configuration and density of the confectionery, thus compressing the mixture within channels 4. The plungers 5 retain this position while closure member 7 is again advanced by the piston of cylinder 107 to seal the discharge outlet 1a and to sever the semisolid confectionery within molds 4 from the fluid mass within hopper 1.

After a further period ($t_3$ in FIG. 4) during which the confectionery has cooled within molds 4, slide 8 is lifted by the piston of cylinder 108 to unblock the ejection ports of molds 4. Subsequently, plungers 5 of the ejector means are further advanced by the piston of cylinder 105 to their extreme forward position, thereby ejecting the warm confectionery onto chute wall 10 which confronts the ejection ports of mold channels 4. On account of the inherent viscosity of the warm chocolate, the confectionery adheres to the array of elements 10a of chute wall 10 and begins to slide down chute 6 under its own weight. Pusher 11 then drives the confectionery down the array of elements 10a of chute wall 10, during the period $t_4$–$t_5$ as shown in FIG. 4, thereafter returning to its elevated position during the period $t_5$–$t_6$.

Conveyor belt 2 may pause in its movement until the confectionery due to a speed differential between the moving conveyor belt and confectionery at the instant the confectionery pieces 9 drop onto the belt. The belt 2 preferably carries the pieces P into a conventional cooling chamber in which they are hardened.

Following the ejection of confectionery from mold channels 4, shutter 8 again descends to seal the ends of mold channels 4, the plungers 5 remaining in their forward positions.

It will be apparent to those versed in the art that further conventional mechanical, electro-mechanical, and hydraulic techniques may be utilized to render the device according to my invention either semi-automatic or fully automatic without departing from the spirit and scope of my invention as defined in the appended claims.

I claim:

1. A device for producing confectionery, comprising:
hopper means provided with a discharge outlet for dispensing a tacky confectionery mixture;
a substantially horizontal mold channel open upwardly and at one end and disposed immediately beneath said outlet for receiving said mixture;
ejector means intermittently operable to discharge pieces of said mixture from said channel by said open end;
substantially vertical wall means confronting the open end of said channel and spaced therefrom while forming an adhesion surface for guiding downwardly the tacky confectionery pieces discharged therefrom;
conveyor means immediately below said wall means for carrying off said pieces; and
pusher means for advancing the ejected confectionery pieces down said wall means, said wall means being provided with a plurality of parallel vertical slots, said pusher means comprising a plurality of spacedly juxtaposed elements extending in a substantially horizontal plane through said slots.

2. A device as defined in claim 1, further comprising a movable closure member interposable between said channel and said outlet.

3. A device as defined in claim 1, further comprising a movable shutter interposable between the open end of said channel and said wall means.

4. A device as defined in claim 1 wherein said wall means is composed of a plurality of spacedly juxtaposed vertical elongated elements terminating at a level just above said conveyor means.

5. A device as defined in claim 1, further comprising another substantially vertical wall means extending downwardly from the open end of said channel.

6. A device as defined in claim 5, wherein said other wall means is composed of a plurality of spacedly juxtaposed vertical elongated elements terminating at a level above said conveyor means.

7. A device for producing confectionery, comprising:
hopper means provided with a discharge outlet for dispensing a tacky confectionery mixture;
a substantially horizontal mold channel open upwardly and at one end and disposed immediately beneath said outlet for receiving said mixture;
ejector means intermittently operable to discharge pieces of said mixture from said channel by said open end;
substantially vertical wall means confronting the open end of said channel and spaced therefrom while forming an adhesion surface for guiding downwardly the tacky confectionery pieces discharged therefrom;
conveyor means immediately below said wall means for carrying off said pieces;
pusher means for advancing the ejected confectionery pieces down said wall means; and
drive means for advancing said pusher means at a variable speed progressively decreasing upon its downward stroke.

8. A device for producing confectionery, comprising hopper means provided with a discharge outlet for dispensing a tacky confectionery mixture, a base plate provided with a substantially horizontal mold channel open upwardly and at one end disposed immediately beneath said outlet for receiving said mixture, a movable closure member interposable between said outlet and said channel, ejector means intermittently operable to compress and discharge pieces of said mixture from said channel by its open end, substantially vertical chute means confronting the open end of said channel and forming an adhesion surface for guiding downwardly the tacky confectionery pieces discharged therefrom, conveyor means below said open end for carrying away said pieces, said chute means comprising two substantially parallel walls terminating at a level just above said conveyor means, a movable shutter interposable between the open end of said channel and said chute means, said shutter being operable to block the open end of said channel during the discharge of said mixture from said hopper means into said mold channel, at least one of said walls being provided with a plurality of parallel vertical slots, and pusher means for advancing said confectionery pieces down said walls, said pusher means comprising a plurality of spacedly juxtaposed elements extending in a substantially horizontal plane through said slots.

9. A device as defined in claim 8, further comprising mechanism for actuating sequentially said shutter, said ejector means, said closure member, and said pusher means to effect discharge of said mixture into said channel, compression of said mixture by said ejector means against said shutter, blockage of said discharge outlet by said closure member, withdrawal of said shutter to unseal the open end of said channel, displacement of said ejector means to discharge said pieces into said chute, lowering of said pusher means to strip said pieces off said walls, raising of said pusher means, return of said shutter to seal the open end of said channel, retraction of said ejector means, and actuation of said closure member to open said discharge outlet of said hopper preparatory to a new cycle.

10. In a device for producing a succession of pieces of a confectionery wherein pieces of confectionery are intermittently ejected from a channel, the improvement which includes means for transferring the pieces of confectionery to a subsequent station below said channel, said means comprising substantially vertical walls depending in the region of said channel and provided with a plurality of horizontally spaced parallel vertical slots while forming a surface for guiding the confectionery pieces downwardly, and a plurality of horizontally spaced coplanar stripper elements lying generally in a horizontal plane and extending respectively through said slots while being movable downwardly from said channel to shift said pieces of confectionery therealong.

11. The improvement defined in claim 10 wherein at least one of said walls is formed from a plurality of individual vertical members suspended from a common support.

References Cited
UNITED STATES PATENTS

| | | | |
|---|---|---|---|
| 804,328 | 11/1905 | Lutze | 107—15.1 |
| 1,178,726 | 4/1916 | Janggen | 107—7.2 |
| 1,277,405 | 9/1918 | Geyer | 107—15.1 |

WALTER A. SCHEEL, *Primary Examiner.*

J. SHEA, *Assistant Examiner.*